(12) United States Patent
Ponder et al.

(10) Patent No.: US 7,708,561 B2
(45) Date of Patent: May 4, 2010

(54) METHOD AND APPARATUS FOR MODIFYING AIRCRAFT SIMULATOR WIDE-ANGLED INFINITY DISPLAY EQUIPMENT MIRROR TO ENLARGE FIELD OF VISION AND FOR RESKINNING AIRCRAFT SIMULATOR SPHERICAL MIRROR CELL TO MINIMIZE MIRROR STRESS AND DISTORTION

(75) Inventors: Michael Luther Ponder, Winter Park, FL (US); Martyn John Rolls, Orlando, FL (US)

(73) Assignee: Q4 Services LLC, Winter Park, FL (US)

( * ) Notice: Subject to any disclaimer, the term of this patent is extended or adjusted under 35 U.S.C. 154(b) by 595 days.

(21) Appl. No.: 11/534,176

(22) Filed: Sep. 21, 2006

(65) Prior Publication Data
US 2007/0069086 A1    Mar. 29, 2007

Related U.S. Application Data

(60) Provisional application No. 60/720,109, filed on Sep. 23, 2005.

(51) Int. Cl.
G09B 19/16 (2006.01)

(52) U.S. Cl. ...................................... 434/40
(58) Field of Classification Search ............... 434/29, 434/30, 34, 35, 38, 39, 40, 44; 345/6, 7
See application file for complete search history.

(56) References Cited

U.S. PATENT DOCUMENTS

| | | | | |
|---|---|---|---|---|
| 2,883,763 | A * | 4/1959 | Schaper | 434/43 |
| 2,999,322 | A * | 9/1961 | Hemstreet | 434/43 |
| 3,718,989 | A * | 3/1973 | McKnight | 434/40 |
| 3,880,509 | A * | 4/1975 | Herndon | 353/12 |
| 4,350,489 | A * | 9/1982 | Gdovin | 434/40 |
| 4,383,740 | A | 5/1983 | Bordovsky | |
| 4,631,867 | A * | 12/1986 | Reed | 451/361 |
| 4,634,384 | A * | 1/1987 | Neves et al. | 434/44 |
| 5,226,816 | A | 7/1993 | Hawkins | |
| 5,433,608 | A * | 7/1995 | Murray | 434/29 |
| 5,566,370 | A * | 10/1996 | Young | 348/36 |
| 5,927,985 | A * | 7/1999 | Lechner | 434/44 |
| 6,118,595 | A * | 9/2000 | Miller | 359/725 |
| 6,188,517 | B1 * | 2/2001 | Neff et al. | 359/451 |
| 6,191,759 | B1 * | 2/2001 | Kintz | 345/8 |

* cited by examiner

*Primary Examiner*—Kurt Fernstrom
(74) *Attorney, Agent, or Firm*—CARR LLP; Theodore F. Shiells

(57) ABSTRACT

A method and apparatus for extending the effective circumferential extent of an original an aircraft simulator mirror cell having a base support structure mounted to a movable platform, the base support structure being in generally the shape of a portion of a sphere of a predetermined radius and having a predetermined circumferential extent defined by original edges of the support structure configured to support a vacuum-shaped reflective film. The improvement includes a pair of extension wing structures having substantially the same spherical radius as the base support structure and a substantial circumferential extent, each of the pair of wing structures being attached to one of the original edges of the base support structure and substantially sealed thereto, the extension wing structures, when attached, extending the effective circumferential extent of the base support structure by a substantial amount, each of the pair of extension wing structures having outer edges for supporting a vacuum-shaped reflective film.

8 Claims, 7 Drawing Sheets

METHOD AND APPARATUS FOR MODIFYING AIRCRAFT SIMULATOR WIDE-ANGLED INFINITY DISPLAY EQUIPMENT MIRROR TO ENLARGE FIELD OF VISION AND FOR RESKINNING AIRCRAFT SIMULATOR SPHERICAL MIRROR CELL TO MINIMIZE MIRROR STRESS AND DISTORTION

CROSS REFERENCE TO RELATED APPLICATIONS

This application relates to, and claims the benefit of the filing date of U.S. provisional patent application Ser. No. 60/720,109 entitled "METHOD AND APPARATUS FOR MODIFYING AIRCRAFT SIMULATOR WIDE-ANGLED INFINITY DISPLAY EQUIPMENT MIRROR TO ENLARGE FIELD OF VISION and METHOD AND APPARATUS FOR RESKINNING AIRCRAFT SIMULATOR SPHERICAL MIRROR CELL TO MINIMIZE MIRROR STRESS AND DISTORTION," filed Sep. 23, 2005, the entire contents of which are incorporated herein by reference for all purposes.

FIELD OF THE INVENTION

The invention relates generally to flight simulators, and more particularly, to techniques for expanding the field of view of a visual display system used with flight simulators.

BACKGROUND OF THE INVENTION

For many years the flight simulator training industry has been using various visual display techniques to provide the pilots with an out of the window view of the world.

The "simulated display industry" started out as a few specialist vendors supplying rigid model systems that had a mechanical "eye" that "flew" over a model board. The movement of this "magic eye" was controlled by the movement of the control column/side sticks in the cockpit and was a purely mechanical linkage system that provided the pilots with some form of terrain and visual representation.

With the growing availability of commercial computer graphics in the early 1970s it was not long before visual system manufacturers moved away from rigid models to some form of computer generated imagery (CGI).

This new computer generated "virtual" environment required some form of electronic display medium to transfer the software driven 'virtual world' to something that the pilot could view in the 'real world'. In the early days this was a set of collimated monitor screens placed directly over each of the cockpit windows. This early simulation display system was the standard for the next decade.

In the early 1980's a company called Rediffusion Simulation Limited developed a unique display system that they christened WIDE (Wide-angled Infinity Display Equipment). This provided a cross cockpit out of the window view for the pilot and for the first time provided something approaching a real world scene. Since that time the word WIDE has been adopted by all visual system vendors as the generic term used to describe what is now the common standard in simulated display systems for aircraft simulators.

The first WIDE displays were all delivered with a 150 degree mirror, thus giving a continuous horizontal field of view of 150 degrees. This 150 WIDE as it is called by industry people is the most common and normal type of display delivered. A simplified schematic view of such a 150 degree display is depicted in FIG. 3.

Recently, the governing bodies of Europe have determined that the most effective training can only be accomplished by using a horizontal field of view of 180 degrees. For the past 4 years all training centers and airlines wishing to attain the highest certification level in Europe and Asia have had to use a 180 WIDE display. This common 180 standard became a pre-requisite for American training centers on Dec. 31, 2005.

This requirement has created a large upgrade market for the manufacturers of 180 mirrors to exploit. In the past few years a growing number of customers are having to remove their existing and perfectly useable 150 display mirrors and replace them with 180 display mirrors. The cost of replacing large state of the art optic display mirrors is very expensive and a complete system upgrade such as this usually costs more than $600,000 (US).

The existing 150 mirror cells that are removed are often sold for little more than the scrap value they bring to customers willing and able to train at lower certification levels.

After much analysis and investigation, the present inventors determined that the current approach of most vendors could be improved and provide an improvement in the geometric accuracy as viewed by the pilots. This analysis led the present inventors to investigate a new and better alternative to the current standard techniques for mirror installation used by other vendors.

The eventual result of this analysis was to develop a technique and subsequent set of tooling that very accurately replicated the standard curvature of the mirror cells in question. This curvature needed to be accurate in both horizontal and vertical directions in order to maintain accuracy and prevent undue distortions to the virtual image and also to prevent damage to the fragile Mylar™ material when being applied.

SUMMARY OF THE INVENTION

In accordance with an embodiment of the present invention, rather than scrap the existing 150 degree mirror cells, a unique technique and specific reskin (see, infra) tooling is used to permit for taking a 150 degree mirror cell and "growing" it into a 180 degree field of view mirror. Further, the same tooling can be used to reskin the reflective film in a manner that minimized distortion. This can be accomplished as follows:

In one embodiment, in an aircraft simulator mirror cell having a base support structure mounted to a movable platform, the base support structure being in generally the shape of a portion of a sphere of a predetermined radius and having a predetermined circumferential extent defined by original edges of the support structure configured to support a vacuum-shaped reflective film, the improvement comprises:

a pair of extension wing structures having substantially the same spherical radius as the base support structure and a substantial circumferential extent, each of the pair of wing structures being attached to one of the original edges of the base support structure and substantially sealed thereto, the extension wing structures, when attached, extending the effective circumferential extent of the base support structure by a substantial amount, each of the pair of extension wing structures having outer edges for supporting a vacuum-shaped reflective film.

In another embodiment, in the aircraft simulator mirror cell, the improvement further comprises structural reinforcing members attaching the extension wing structures to the movable platform such that the extension wing structures remain securely affixed during normal use and motion of the movable platform.

In another embodiment, in the aircraft simulator mirror cell described above, the improvement further comprises attachment fasteners between the base support structure and the extension wing structures that are accessible from outside the base support structure with the reflective film in place on the outer edges of the extension wing structures.

In another embodiment, in the aircraft simulator mirror cell described above, the improvement further comprises means for attaching and sealing the reflective film to the original edges of the base support structure while the reflective film is vacuum-supported on the outer edges of the extension wing structures, such that the extension wing structures can be removed with the reflective film remaining attached and sealed to the original edges of base support structure.

In another embodiment, in an aircraft simulator mirror cell having a base support structure mounted to a movable platform, the base support structure is generally in the shape of a portion of a sphere of a predetermined radius and having a predetermined circumferential extent defined by original edges of the support structure configured to support a vacuum-shaped reflective film, a method for increasing the effective circumferential extent of the base support structure, is provided comprising the steps of:

while the reflective film is unattached, attaching one each of a pair of extension wing structures having substantially the same spherical radius as the base support structure and a substantial circumferential extent, to respective ones of the original edges of the base support structure and substantially sealing them thereto such that the extension wing structures, when attached, extend the effective circumferential extent of the base support structure by a substantial amount, each of the pair of extension wing structures having outer edges for supporting a vacuum-shaped reflective film;

attaching a reflective film to the outer edges; and applying a vacuum between the reflective film and the base supporting structure with the attached extension wing structures to shape the reflective film to approximately the shape of a portion of a sphere.

In another embodiment, the foregoing method of paragraph 5 further comprises the step of attaching structural reinforcing members between the extension wing structures and the moveable platform such that the extension wing structures will remain securely affixed during normal use and motion of the movable platform.

In another embodiment of the method of paragraph 5, the extension wing structures are attached to the base support structure by fasteners that are accessible from outside the base support structure with the reflective film in place on the outer edges of the extension wing structures and further comprises the steps of: attaching and sealing the reflective film to the original edges of the base support structure while the reflective film is vacuum-supported on the outer edges of the extension wing structures;

disconnecting the reflective film from the outer edges of the extension wing structures while leaving the reflective film in place on the outer edges of the extension wing structures;

disconnecting the fasteners between the extension wing structures and the base support structure; and removing the extension wing structures.

DETAILED DESCRIPTION

The present invention enables extending the mirror assembly 16 out beyond its standard 150 degrees of horizontal field of view by fixing a set of vacuum wing extension structure boxes 30 at the extremities of the original mirror cell base support structure. This present invention solves the technical problems that needed to be resolved and overcome.

Figure 1:
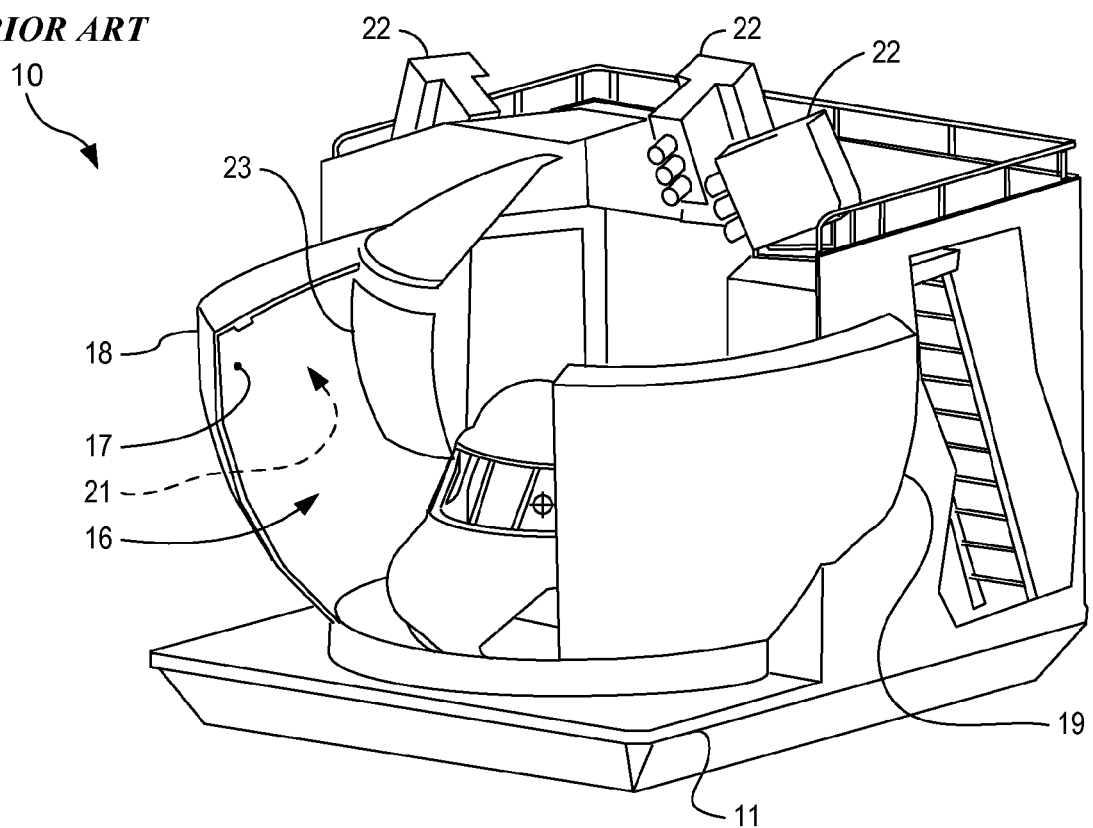
FIG. 1 depicts a general layout of a typical prior art moving platform mounted wide angled aircraft simulator display system showing location of collimating mirror.
Figure 2:
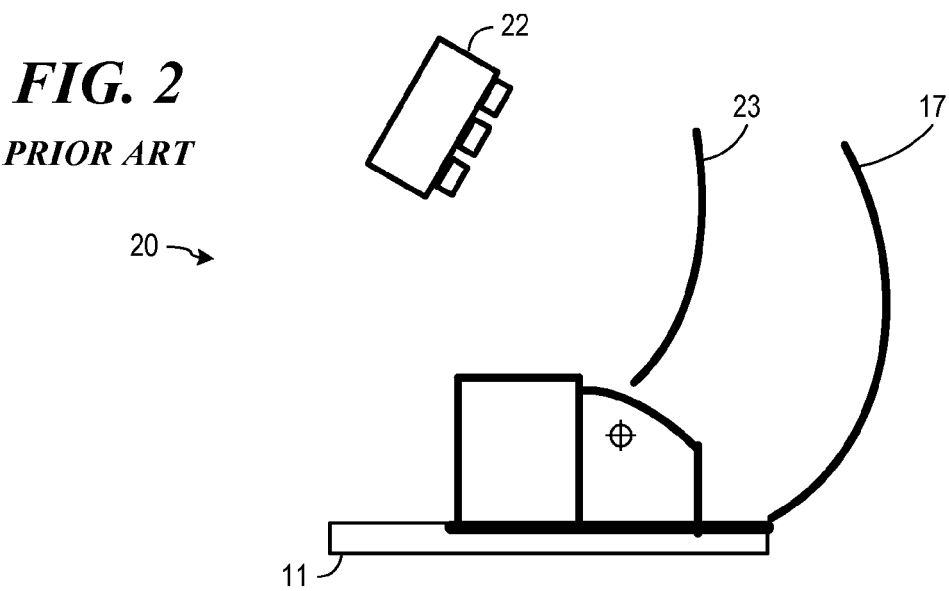
FIG. 2 depicts a conceptual arrangement of a typical prior art wide angled display system.
Figure 3A:
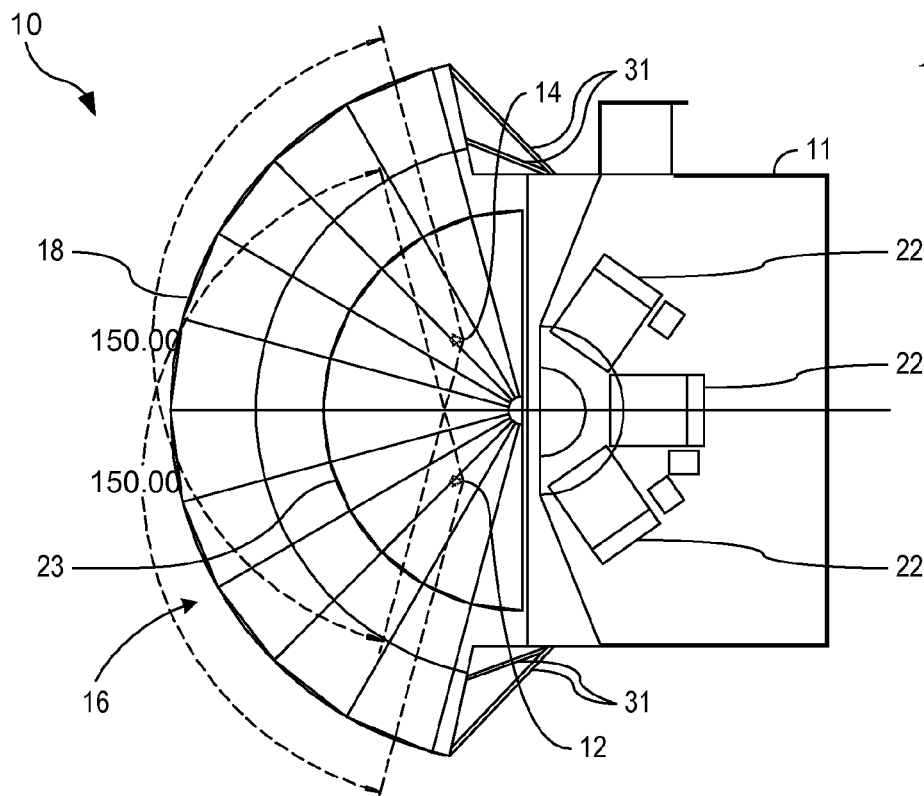
FIG. 3A depicts a simplified plan view from above of an existing base mirror cell of as prior art aircraft simulator system.

As depicted in FIGS. 1, 2 and 3A, a standard collimated display system 20 of an aircraft simulator 10 mounted to a movable platform 11 is depicted. With display system 20, an image is projected onto a translucent back projection screen 23 from which it is reflected to the observer (in this case, a pilot and co-pilot, the positions of which are indicated by arrowheads 12 and 14 in FIG. 3A) by a large radius spherical section mirror assembly 16. The radius of the spherical section mirror is commonly approximately 10 feet, although the radius is not critical. With few exceptions, such mirrors are almost exclusively manufactured using a soft plastic reflective film, commonly reflective Mylar™ film 17.

FIG. 1 depicts a general layout of typical wide angled display system 20 of an aircraft simulator 10 showing location of collimating mirror film 17, projectors 22 that form an intermediate image, sharply focused on the surface of the back projection screen 23. It is this image that is "reflected" onto the Mylar™ film 17 of the large mirror assembly 16 to be seen by the pilot 12 and co-pilot 14. The use of the Mylar™ film 17 in this capacity was first used by Rediffusion in the early days.

To make this mirror assembly 16, the Mylar™ film 17 is laid over the edge of a mirror cell support 18 and secured in place on the edge 19. This "edge" 19 is referred to as the forming edge of the mirror cell support 18. This forming edge 19 runs along the top and bottom of the mirror cell support 18 and down both sides in the shape of a sector of a circle and provides the frame over which the Mylar™ film 17 is secured. The shape and size of this forming edge 19 are critical to determining the shape of the completed mirror assembly 16.

Distortions caused by unequal stresses are generally introduced into the Mylar™ material at this stage in the process, when the Mylar™ film 17 is laid over the hard surface of the forming edge 19. This phenomenon is considered by most display vendors to be inevitable. Extreme cases of this distortion can produce displays with a 'hall of mirrors' type effect more commonly seen at the fair ground!

When secured in place on the forming edge 19, the Mylar™ is then subjected to a constant vacuum applied to the air-tight space 21 between the Mylar™ mirror film 17 and the mirror cell support 18 in order to 'suck' the Mylar™ film 17 back into its final shape of a portion of a sphere. When sucked into its final spherical shape, the mirror film 17 will be maintained about 2 inches from the surface of the mirror cell support 18. The spherical shape of the film 17 is maintained by controlling the volume of air in the chamber with a positional sensor and control valve (not shown).

Observers (such as the pilot and co-pilot) viewing the projected image from projectors 22 onto the convex surface of the projection screen 23 reflected through the spherical collimating mirror see the resultant image close to optical infinity. It is this collimating effect that provides the "depth" to the viewed image required for adequate training of commercial pilots.

The alternative to Mylar™ film 17 for the mirror assembly 16 was very heavy, expensive and fragile glass mirrors. The main issue with the glass mirrors is that that they made the simulator too heavy for the available motion systems of the time and correspondingly expensive to manufacture.

Since that time every one of the visual system vendors has come to adopt the Mylar™ mirror approach to providing large mirror display systems.

FIG. 2 depicts a conceptual arrangement of a typical wide angled display system 20. This 'WIDE' display approach was subsequently adopted by all the major visual display system vendors and is now the industry norm. This adoption of the Rediffusion WIDE can be seen by the fact that a continuous field of view for pilot is now a pre-requisite for Federal Aviation Administration (FAA) certification of training devices.

Figure 3B:
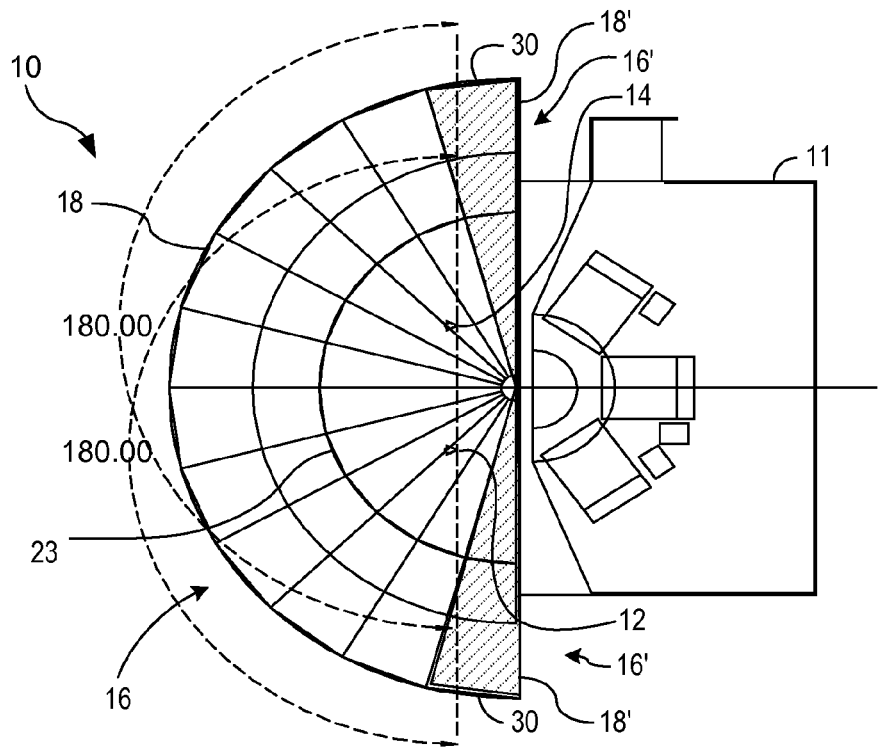
FIG. 3B depicts a simplified plan view from above of the existing base mirror cell of FIG. 3A, that has been modified to include extension wing supports for the reflective film mirror in accordance with an embodiment of the invention.
Figure 8A:
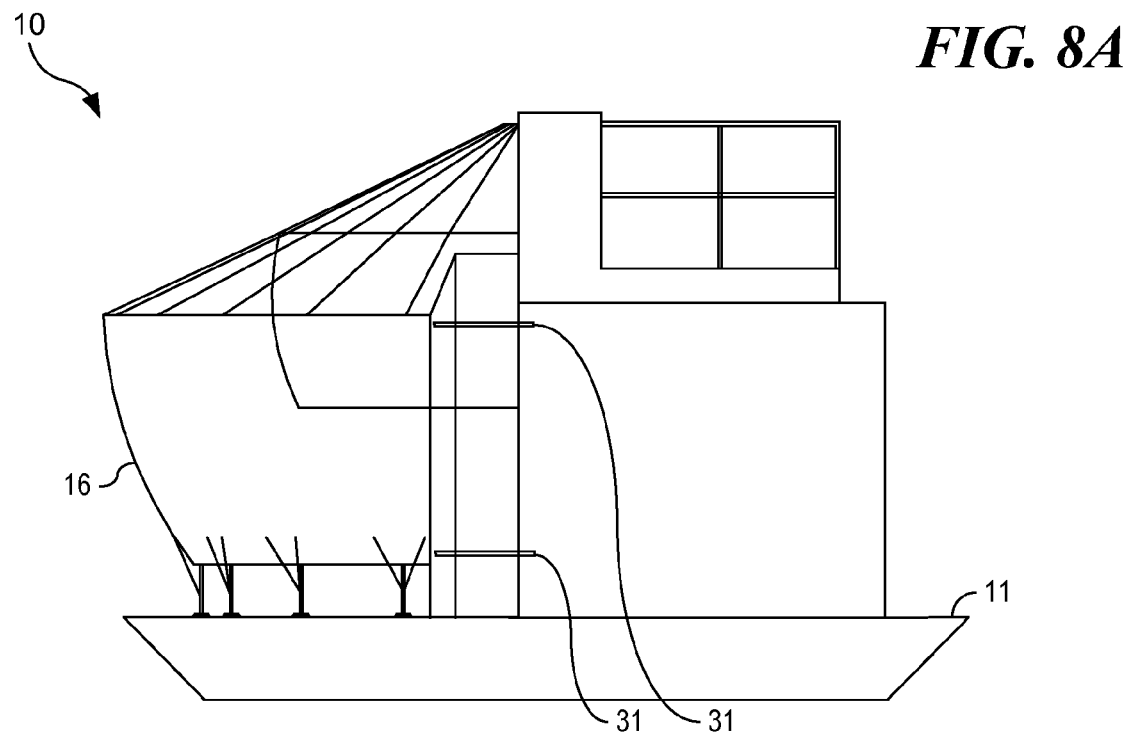
FIG. 8A depicts a simplified elevation view from the left side of an existing base mirror cell of a prior art aircraft simulator system.
Figure 8B:
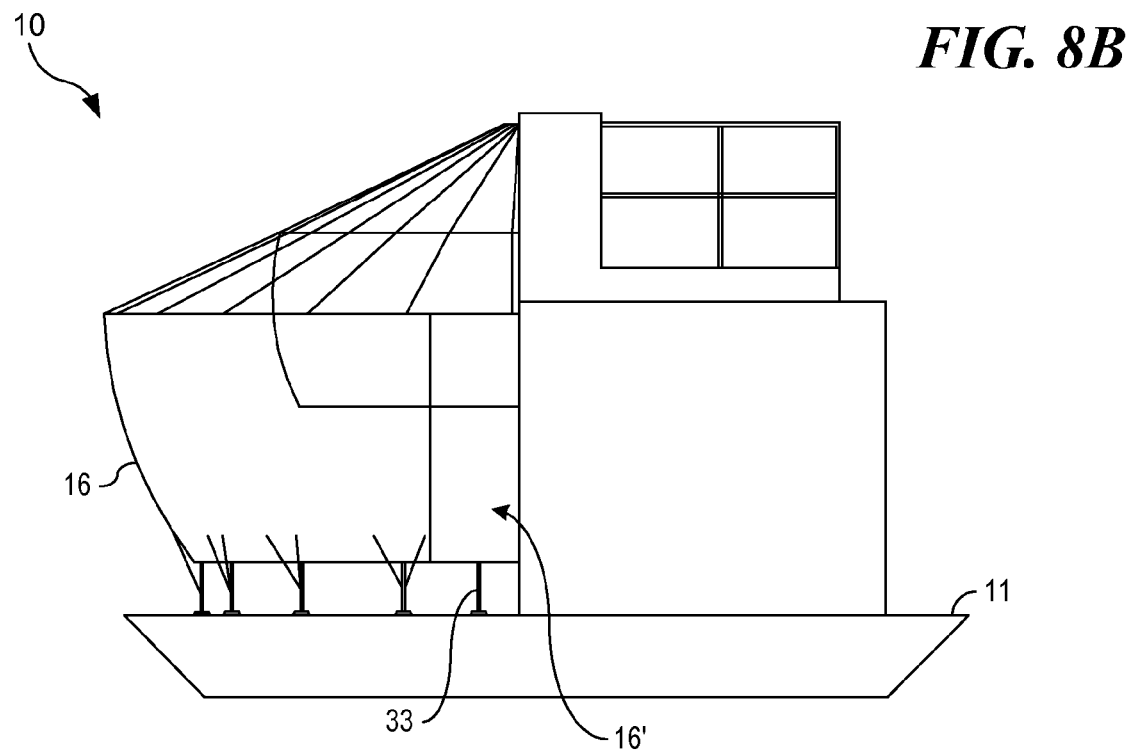
FIG. 8B depicts a simplified elevation view from the left side of the existing base mirror cell of FIG. 8A, that has been modified to include an extension wing structure for the reflective film mirror in accordance with an embodiment of the invention.

FIGS. 3A and 8A depict an existing mirror assembly 16 and FIGS. 3B and 8B depict a modified mirror with extensions 18' in accordance with an embodiment of the invention. In order to install the extensions of this embodiment, the first step in the update process is to the remove the mirror cell assembly 16 from the simulator. This process entails the removal of the bracing bars 31 used on both sides of the mirror assembly 16 to attach it to the simulator and provide stiffening and structural support. FIGS. 3A 8A depicts the original mirror assembly 16 and FIGS. 3B and 8B depicts the mirror assembly 16 with the extension structure 18' attached, to extend the mirror assembly 16 to 180 degrees. After this modification, the bracing bars 31 shown in FIGS. 3A and 8A are discarded as they will no longer be used.

Once the mirror assembly 16 is removed from the simulator and placed on the floor the existing Mylar™ film 17 is removed from the cell 18. The existing end bars 31 are removed from the left and right hand vertical edges of the mirror cell assembly 16. These end bars attach to the existing forming edge 19 of the mirror cell.

Figure 4:
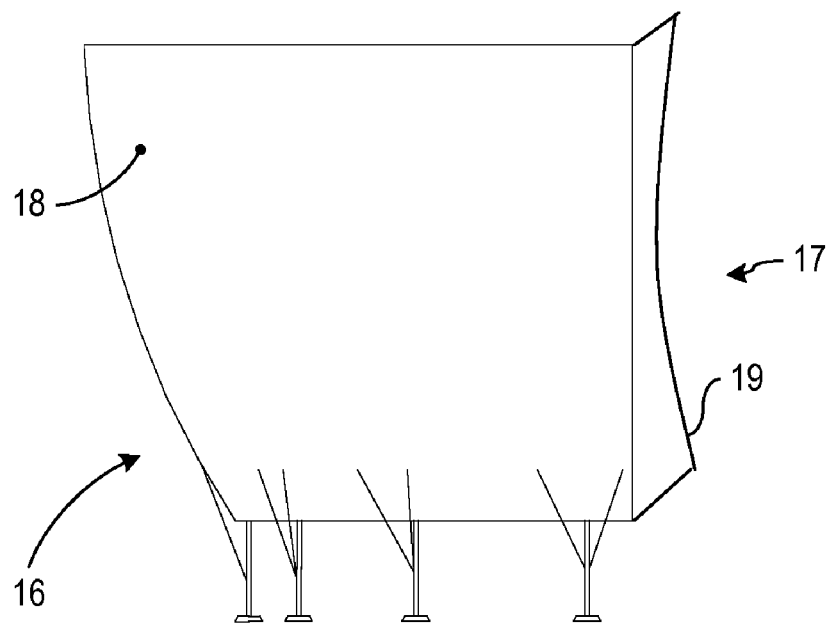
FIG. 4 depicts a plan view of a left hand edge of existing mirror cell.

FIG. 4 depicts a left hand edge 19 of an existing mirror cell assembly 16. At this stage we are left with a hard structure that is the curved mirror cell assembly 16. Around the edge of this mirror cell is a fixed forming edge 19. As depicted in FIGS. 3B and 8B, the new segments 18' are then mounted on the left and right hand edges of the mirror assembly 16 and permanently fixed to the existing cell 16 using pre-drilled holes (not shown) in the mirror mounting plate.

Figure 5:
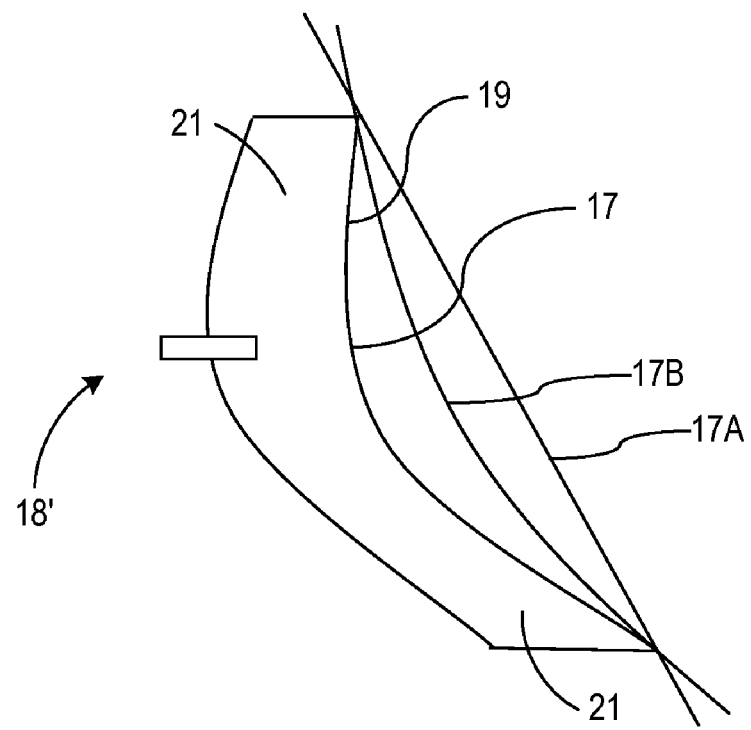
FIG. 5 depicts a simplified cross-sectional elevation view of a left side extension wing structure, in accordance with an embodiment of the invention, for the base support structure for the reflective film mirror depicted in FIG. 4.
Figures 6A, 6B:
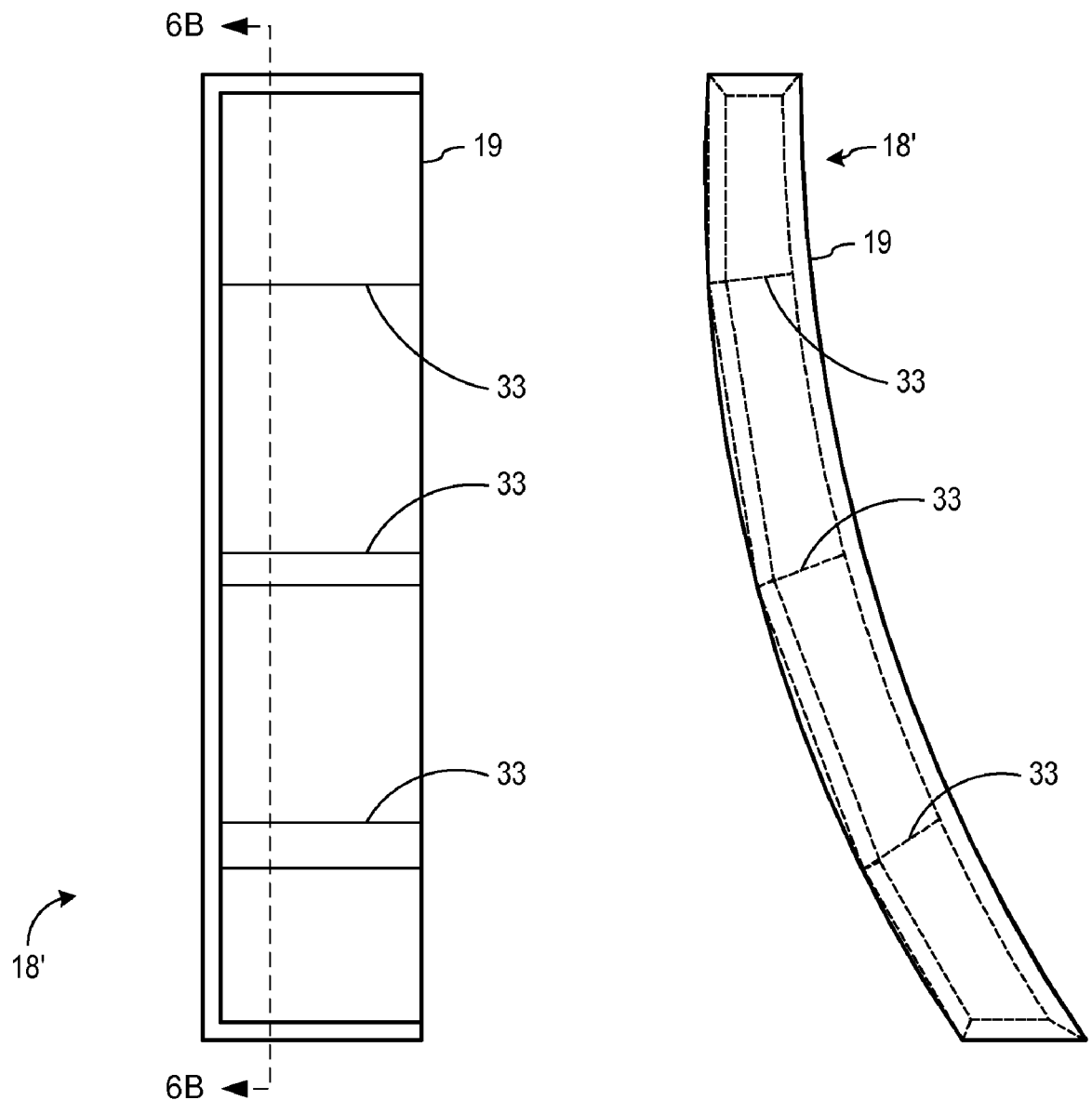
FIG. 6A depicts a view from the inside looking out of the outer edge of the left side one of the pair of extension wing structures of one embodiment of the invention.
FIG. 6B depicts a sectional view along the line 6B-6B of FIG. 6A, viewed from the rear of the outer edge of the left side one of the pair of extension wing structures depicted in FIG. 6A.
Figure 7:
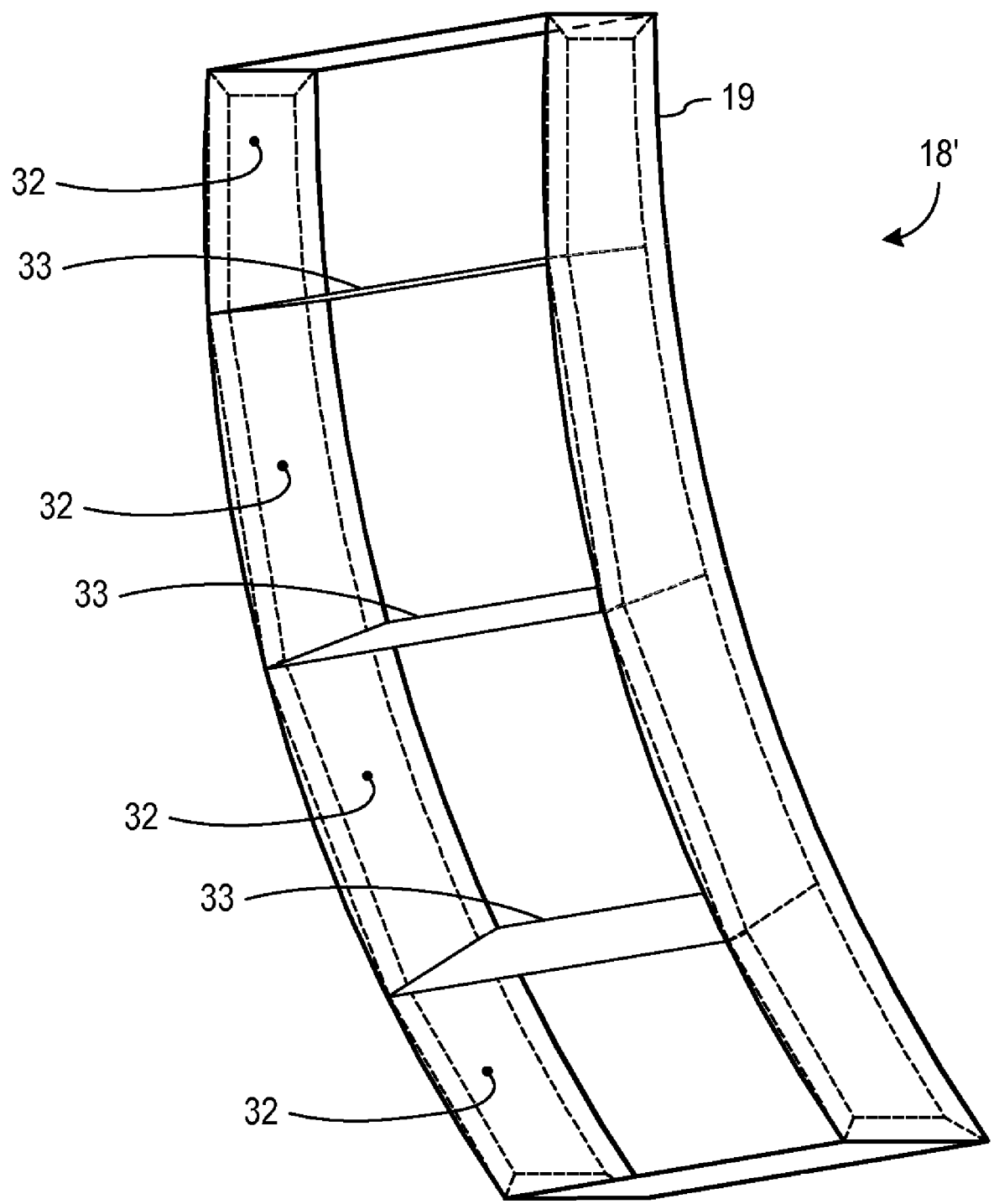
FIG. 7 depicts an orthogonal view, partly in phantom, of the left side one of the pair of extension wing structures depicted in FIG. 6B, viewed from the outside.

FIG. 5 depicts mirror segments 18' for the left hand side of the mirror cell support 18. This drawing is similar to FIG. 4, but is reversed for the right hand side.

FIGS. 6A-B, 7, 8A-B and 9 show the left hand segment of the extensions 18' of one embodiment of the invention. In order to maintain the correct shape of the mirror film 17, the segments 18' have stiffening plates 33 mounted horizontally inside the segments. These plates 33 are permanently secured and form an integral stress and load bearing part of the segments 18'.

In order for a vacuum to be applied equally inside the entire mirror cell assembly 16 (including segments 18') when the Mylar™ film 17 is applied, holes are drilled through the mounting plates 32 and into the existing mirror cell assembly 16. These holes are left open to allow the free flow of air and allow vacuum to be applied in the extended segments, in the space 21 between the film 17 and the cell 16. Great care is important in the location of these holes in order that the structural integrity of the segment is not compromised.

Extra stiffening beams can be applied directly to the mounting plate 32 in order to ensure that shape and strength of the structure is maintained. A mounting frame with a supporting leg 33 is added to the base of each segment 18' to provide further support when the segment 18' is mounted to the existing mirror cell assembly 16.

When both sides of the mirror cell assembly 16 have been upgraded and fitted with the extension segments 18', the mirror is re-skinned with replacement Mylar™ film 17 and is then replaced on the simulator 10.

The original mirror cell assembly 16 will need to be extensively modified to allow the fitting of the additional segments 18'. This modification will entail the removal of the end pieces currently fitted to the 150 degree mirror cells 16. A new terminating assembly will be fitted to these mirror cells that will allow for a clean and uniformly accurate mating surface upon which the extension vacuum box segments 18' will be attached.

Figure 9:
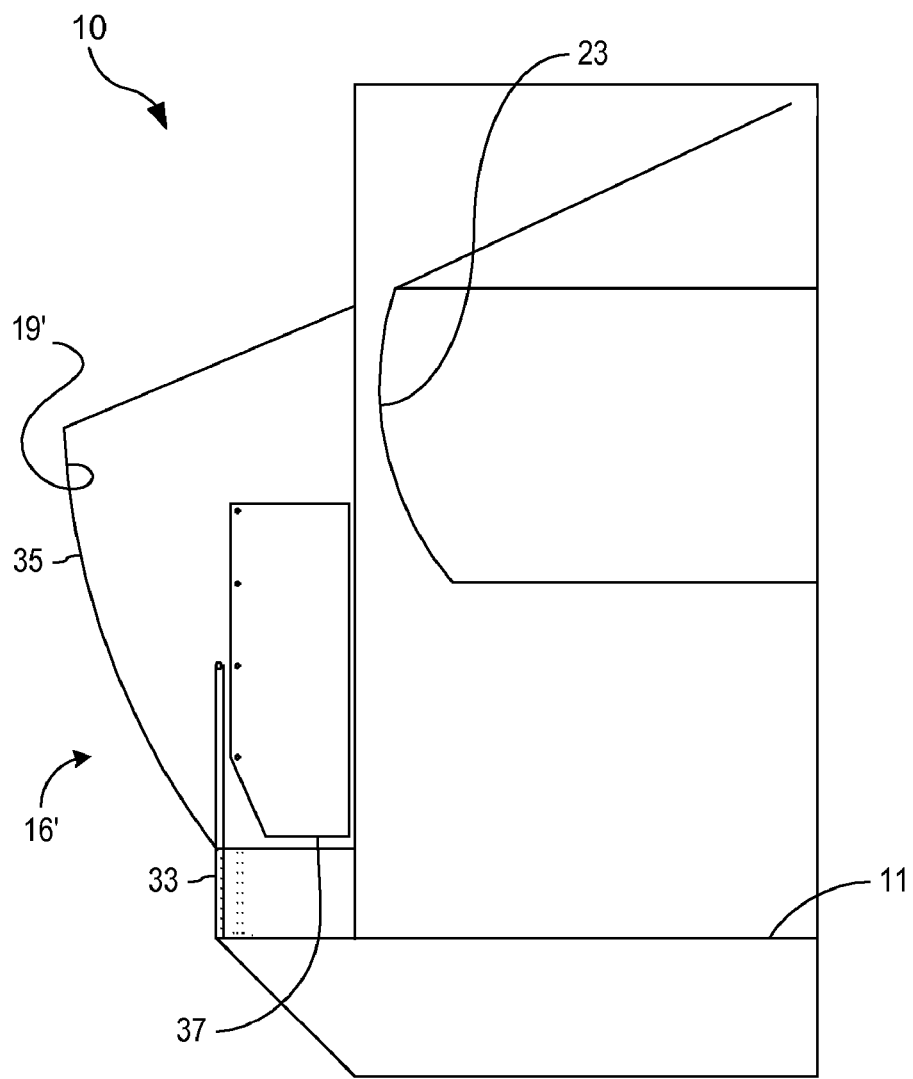
FIG. 9 depicts a simplified elevation view from behind of the left side of the existing base mirror cell of FIG. 8B, including the extension wing structure for the reflective film mirror in accordance with an embodiment of the invention and a reinforcing leg attached between the extension wing structure and the movable platform to secure the extension wing structure in place during normal movement of the platform.

Due to the fact that segments 18' have been added to the mirror cell assembly 16 it is evident that the existing bracing bars 31 are no longer useable due to the existing mounting plates being moved. Furthermore, the new geometry of the mirror precludes direct access to the existing mounting locations. For this reason, in one embodiment of the present invention, the existing bracing bars 31 and structure are replaced with a new 'D' plate 35, as depicted in FIG. 9. This D plate is fitted to the end of extension segments 18' of the extended mirror cell on one side and the other (flat side of the D is mounted directly to the simulator). The metal D plate can include an inspection port 37 that provides not only structural rigidity but also prevents light leaking into the mirror cell itself. A further benefit is that contamination of the mirror surface can be prevented. Adjustable frames can also be provided on the segments 18' to provide for a continuous and accurate forming edge 19' on the new extension segments 18'.

The segments 18' and hardware used in the present invention needs to be held solidly and accurately in place for many years to come when fitted to the simulator with a full motion system that will stress the structure for many years to come.

In one embodiment, a method of mounting the segments to the existing 150 degree mirror cell will use threaded inserts and bonding material between the new segments 18' and the edge of the original mirror cell assembly 16 in order to provide rigidity and some amount of damping for when the mirror is subjected to vibrations and continued motion of the moving platform 11 when fitted to the full flight simulator 10.

Much investigation has taken place to determine the optimum solution for this upgrade. In one embodiment, the extension segments 18' are manufactured from a glass fiber composite material. However, dependent upon required application and existing mirror structure it may be decided to use metal vacuum boxes.

Careful alignment of the mirror forming edge 19' and the exterior curvature are critical considerations to be accounted for and checked at this time in order to ensure a uniform shape to the mirror surface and a clean curvature to the external surface.

The external surface finish of the existing mirror cell assembly 16 is typically a bubble/stipple effect that is painted white. In the present invention, the vacuum box extensions 19' can match this surface finish in both texture and colour for the exterior of the extension segments 18' to ensure a uniform smooth exterior finish across the entire mirror cell assembly.

In summary, the unique nature of this approach can be viewed against the current industry standard of disposing of the standard 150 degree mirrors and fitting new hardware to existing trainers. In the past few years a number of existing 150 degree mirror cells have been destroyed as there appeared no industry option available. The present invention is unique in concept and application. The present inventors have reviewed each issue that has arisen and have developed a solution to each.

In another embodiment of the invention, the extension boxes 18' can be used temporarily as reskin tooling to be temporarily attached to these extension vacuum boxes 18'. In this case, the extension boxes 18' are used only during the reskinning procedure and are removed when the reskinning is complete, prior to placing the simulator 10 back into service. This is discussed in more detail below.

Every Mylar™ mirror manufacturer uses some type of tooling to assist in the application of the mirror skin 17 to the mirror cell assembly 16 to assist in achieving a mirror surface with the minimum of distortion at both ends of the mirror. The tooling can be either removable or built into the mirror cell assembly 16. The tooling is usually referred to as skinning boxes, wings, tensioning devices or other tooling. In some cases a combination of designs is used. There are different approaches to achieve the same goal, which is to stretch the skin over the mirror cell as uniformly as possible.

In reskinning, a problem which needs to be overcome is that at each end of the mirror cell the skin needs to be stretched from its vertical "cord" position across the mirror cell to its radial position at each end of the mirror cell so the vacuum can be applied using a method that will introduce the minimum of stress and distortion. In the prior art, the technique is to hold the skin using a mechanical device (tensioning tool) that then pulls/pushes the mirror skin back against the mirror cell prior to fixing he mirror into position and applying the vacuum.

The present inventors have found, however, that a better method for reskinning the mirror cell assembly 16 is to temporarily extend the mirror cell assembly 16 using a structure (wings/skinning boxes) that supports the skin and then to initially attach the Mylar™ film 17 to the forming edge of these temporary skinning boxes. The aim of the tooling is to temporarily extend the true field of the mirror beyond the final field of view setting.

In this method, the present inventors first temporarily extend the horizontal field of view of the mirror by a total of 30 degrees (15 degrees either side) beyond its final field of view, although more or less can be used to good effect. This is done by attaching temporary 15 degree extensions 18' to either side of the mirror cell.

Then, the soft Mylar™ mirror material is securely located in place on the forming edges 19' of the extensions 18', as previously described. When the Mylar™ skin is vacuumed back into position, while attached to the forming edges 19' of the extensions 18', any distortion is transferred from the mirror cell into the section of the mirror that is in the vicinity of the attachment edges 19' of these extensions 18'. Then, the mirror skin (Mylar™) 17 is cut and the re-skin tooling used to extend the mirror is removed. The resulting mirror assembly 16 is once again returned to its original degree field of view and attached to the original forming edges 19. This leaves a more stress-free and distortion-free edge of the Mylar™ film 17 at the original forming edge 19 once the extensions are removed. With the mirror cell assembly 16 extended in this way, the present inventors were better able to monitor and adjust mirror tensioning and therefore provide improved symmetry and accuracy of display.

The foregoing reskin tooling and technique can also be employed in combination with the embodiment of the invention described above, where the extensions are permanently attached to extend the horizontal field of view of an existing spherical mirror from 150 to 180 degrees. In this case, two sets of extension boxes 18' can also be used; one permanent to extend the field of view and one temporary, to minimize distortion during the reskinning process. In this case, the first set of extension boxes is attached to extend the original 150 degree field of view to 180 degrees. This first set of these extension boxes 18' will remain in place permanently. Then, in order to minimize distortion of the mirrors 18 during the mirror reskinning process, a second set of extensions is temporarily attached to temporarily extend the mirror cell assembly 16, with its extensions 18' still further, for purposes of facilitating attaching the Mylar™ during the reskinning process. However, this second set of extensions 18' will be removed prior to completion of the reskinning process.

To use this method in the method of the present invention, a first set of extensions 18' is installed onto the existing forming edges 19, typically adding 15 degrees to each side, which will increase the field of view from 150 degrees to 180 degrees. These first extensions 18' are structurally reinforced and supported as they will become a permanent part of the structure, as previously described.

Then, a second set of 15 degree skinning boxes 18' is attached to the first set. Thus, there can initially be 30 degrees of extension added to each side of the mirror cell assembly 16. Then, the Mylar™ film 17 is attached to the edges of the skinning boxes (i.e., the second set of extensions) and the Mylar™ film 17 vacuumed into place to remove or minimize any distortion or stress on the Mylar™ in the vicinity of the forming edge 19' of the first extension.

The Mylar™ film 17 is then permanently attached to the forming edges 19' of the first set of extensions 18', which are left in place permanently during subsequent use of the simulator 10. The temporary skinning extension boxes 18', which were used to minimize stress and distortion in the Mylar™ mirror film 17 at the forming edges 19' of the first extensions, are then removed, leaving the Mylar™ mirror film 17 attached to the edges 19' of the extensions 18' of the mirror cell assembly 16. If permanent extensions 18' have been added, this will be to the edge of the permanent first set of extensions 19', thus adding 15 degrees of horizontal field of view on either side. The result is a spherical mirror assembly 16 with an enlarged field of view and relatively free of uneven stress and distortion at the forming edge of the first extensions.

What is claimed is:

1. In an aircraft simulator mirror cell having a base support structure mounted to a movable platform, the base support structure being in generally the shape of a portion of a sphere of a predetermined radius and having a predetermined circumferential extent defined by original edges of the support structure configured to support a vacuum-shaped reflective film, the improvement comprising:

a pair of extension wing structures having substantially the same spherical radius as the base support structure and a substantially circumferential extent, each of the pair of wing structures being attached to one of the original edges of the base support structure and substantially sealed thereto, the extension wing structures, when attached, extending the effective circumferential extent of the base support structure by a substantial amount, each of the pair of extension wing structures having outer edges for supporting a vacuum-shaped reflective film and a reflective film supported on the outer edges of the extension wing structures, the reflective film being vacuumed-shaped into a portion of a generally spherical shape.

2. In the aircraft simulator mirror cell defined in claim 1, the improvement further comprising structural reinforcing members attaching the extension wing structures to the movable platform such that the extension wing structures remain securely affixed during normal use and motion of the movable platform.

3. In the aircraft simulator mirror cell defined in claim 1, the improvement further comprising attachment fasteners between the base support structure and the extension wing structures that are accessible from outside the base support structure with the reflective film in place on the outer edges of the extension wing structures.

4. In an aircraft simulator mirror cell having a base support structure mounted to a movable platform, the base support structure being in generally the shape of a portion of a sphere of a predetermined radius and having a predetermined circumferential extent defined by original edges of the support structure configured to support a vacuum-shaped reflective film, the improvement comprising:

a pair of extension wing structures having substantially the same spherical radius as the base support structure and a substantial circumferential extent, each of the pair of wing structures being attached to one of the original edges of the base support structure and substantially sealed thereto, the extension wing structures, when attached, extending the effective circumferential extent of the base support structure by a substantial amount, each of the pair of extension wing structures having outer edges for supporting a vacuum-shaped reflective film, further comprising means for attaching and sealing the reflective film to the original edges of the base support structure while reflective film is vacuum-supported on the outer edges of the extension wing structures, such that the extension wing structures can be removed with the reflective film remaining attached and sealed to the original edges of base support structure.

5. In an aircraft simulator mirror cell having a base support structure mounted to a movable platform, the base support structure being in generally the shape of a portion of a sphere of a predetermined radius and having a predetermined circumferential extent defined by original edges of the support structure configured to support a vacuum-shaped reflective film, a method for increasing the effective circumferential extent of the base support structure, comprising the steps of:

while the reflective film is unattached, attaching one each of a pair of extension wing structures having substantially the same spherical radius as the base support structure and a substantial circumferential extent, to respective ones of the original edges of the base support structure and substantially sealing them thereto such that the extension wing structures, when attached, extend the effective circumferential extent of the base support structure by a substantial amount, each of the pair of extension wing structures having outer edges for supporting a vacuum-shaped reflective film;

attaching a reflective film to the outer edges; and applying a vacuum between the reflective film and the base supporting structure with the attached extension wing structures to shape the reflective film to approximately the shape of a portion of a sphere.

6. The method defined in claim 5 further comprising the step of attaching structural reinforcing members between the extension wing structures and the moveable platform such that the extension wing structures will remain securely affixed during normal use and motion of the movable platform.

7. The method defined in claim 5 wherein the extension wing structures are attached to the base support structure by fasteners that are accessible from outside the base support structure with the reflective film in place on the outer edges of the extension wing structures and further comprising the steps of:

attaching and sealing the reflective film to the original edges of the base support structure while the reflective film is vacuum-supported on the outer edges of the extension wing structures;

disconnecting the reflective film from the outer edges of the extension wing structures while leaving the reflective film in place on the original edges of the base support structure;

disconnecting the fasteners between the extension wing structures and the base support structure; and removing the extension wing structures.

8. In the aircraft simulator mirror cell defined in claim 1, the improvement further comprising wherein at least part of a shape of the vacuum shaped reflective film is controlled at least in part by a vacuum within said extension wing structures.

* * * * *